US012681403B2

(12) United States Patent
Iguchi et al.

(10) Patent No.: US 12,681,403 B2
(45) Date of Patent: Jul. 14, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Moegi Iguchi, Kanagawa (JP); Yosuke Tsurumi, Kanagawa (JP); Yukiko Kamijo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 554 days.

(21) Appl. No.: 18/188,487

(22) Filed: Mar. 23, 2023

(65) Prior Publication Data

US 2024/0094653 A1 Mar. 21, 2024

(30) Foreign Application Priority Data

Sep. 1, 2022 (JP) ................................ 2022-139505

(51) Int. Cl.
*G03G 9/097* (2006.01)

(52) U.S. Cl.
CPC ..... *G03G 9/09716* (2013.01); *G03G 9/09725* (2013.01)

(58) Field of Classification Search
CPC ........... G03G 9/09716; G03G 9/09725; G03G 9/09733
See application file for complete search history.

(56) References Cited

U.S. PATENT DOCUMENTS

| | | | |
|---|---|---|---|
| 5,451,481 A | 9/1995 | Law et al. | |
| 2009/0226218 A1 | 9/2009 | Takatsuka et al. | |
| 2013/0164670 A1 | 6/2013 | Nakayama et al. | |
| 2013/0252157 A1* | 9/2013 | Kawakami ......... | G03G 9/09725 430/108.1 |
| 2014/0308608 A1 | 10/2014 | Veregin et al. | |
| 2022/0128914 A1 | 4/2022 | Omokawa et al. | |

FOREIGN PATENT DOCUMENTS

| | | |
|---|---|---|
| EP | 0980029 | 2/2000 |
| EP | 1544685 | 6/2005 |
| JP | 2009204959 | 9/2009 |
| JP | 2013200380 | 10/2013 |
| JP | 2020142959 | 9/2020 |

OTHER PUBLICATIONS

"Search Report of Europe Counterpart Application", issued on Jan. 24, 2024, p. 1-p. 7.
"Notice of Reasons for Refusal of Japan Counterpart Application", issued on May 19, 2026, with English translation thereof, p. 1-p. 5.

* cited by examiner

*Primary Examiner* — Peter L Vajda
*Assistant Examiner* — Jenna Kuipers
(74) *Attorney, Agent, or Firm* — JCIPRNET

(57) ABSTRACT

An electrostatic charge image developing toner contains alkylsilane-treated silica particles, a linear aliphatic hydrocarbon having 10 or more and 18 or less carbon atoms, and toner particles.

18 Claims, 2 Drawing Sheets

ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-139505 filed Sep. 1, 2022.

BACKGROUND

(i) Technical Field

The present invention relates to an electrostatic charge image developing toner, an electrostatic charge image developer, a toner cartridge, a process cartridge, and an image forming apparatus.

(ii) Related Art

JP2020-142959A proposes "a hydrophobic silica powder having a particle size ($D_{50}$) as measured by a laser diffraction method of 300 nm or less, a particle size distribution index ($D_{90}/D_{10}$) of 3.0 or less, a hydrophobicity of 60% by volume or more, and an organic acid content of 1 to 300 ppm".

SUMMARY

Aspects of non-limiting embodiments of the present disclosure relate to an electrostatic charge image developing toner that contains alkylsilane-treated silica particles and toner particles, in which, compared to a case of containing a linear aliphatic hydrocarbon having less than 10 carbon atoms or a linear aliphatic hydrocarbon having more than 18 carbon atoms, in a case where images having a low image density (for example, image density of 1%) are continuously formed in a normal-temperature and low-humidity environment (for example, 21° C. and 10% RH), the toner is stored in a high-temperature and high-humidity environment (for example, 28° C. and 85% RH), and then an image having a high image density (for example, image density of 40%) is formed, adhesion of the toner to a non-image portion is suppressed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following means. According to an aspect of the present disclosure, there is provided an electrostatic charge image developing toner containing alkylsilane-treated silica particles, a linear aliphatic hydrocarbon having 10 or more and 18 or less carbon atoms, and toner particles.

BRIEF DESCRIPTION OF THE DRAWINGS

Exemplary embodiment(s) of the present invention will be described in detail based on the following figures, wherein.

DETAILED DESCRIPTION

Figure 1:
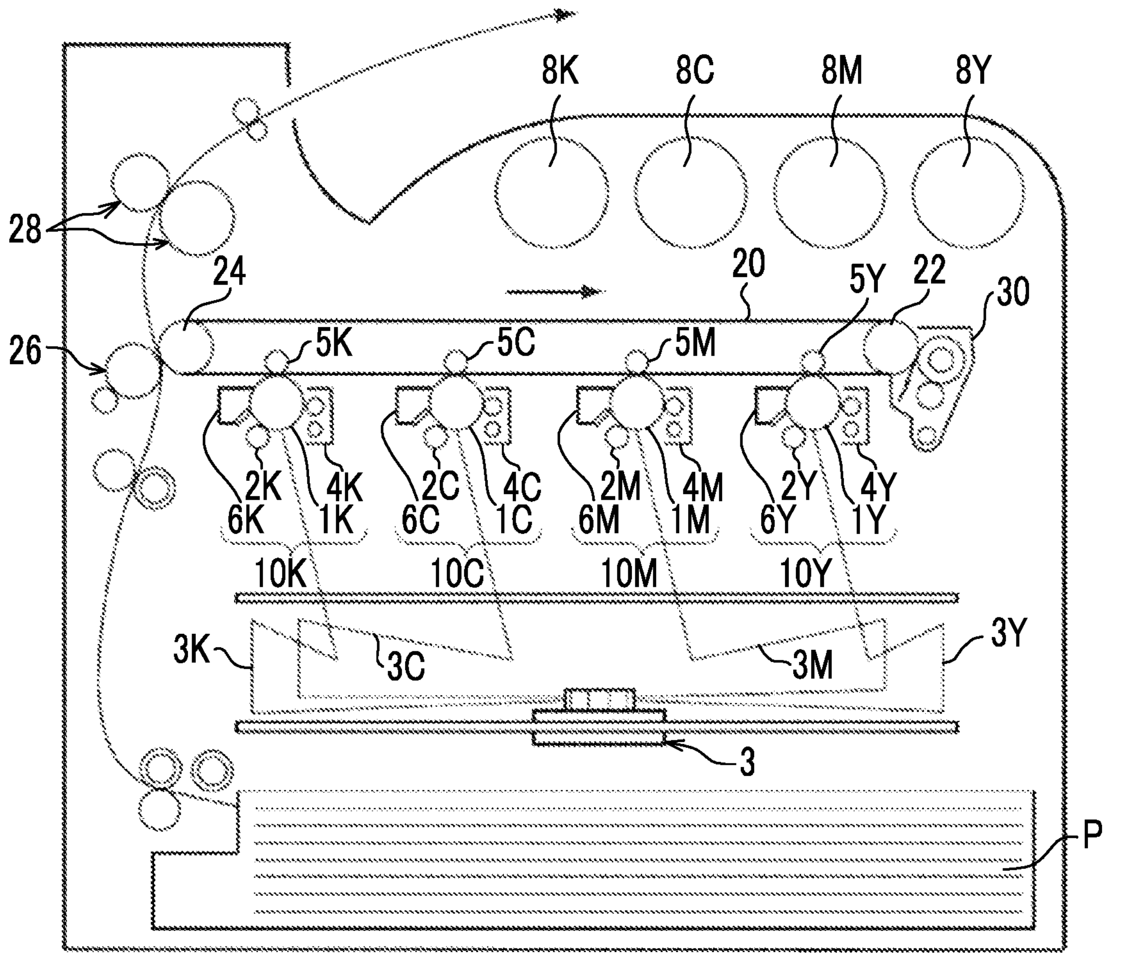
FIG. 1 is a view schematically showing the configuration of an image forming apparatus according to the present exemplary embodiment.

The exemplary embodiments as an example of the present invention will be described below. The following descriptions and examples merely illustrate the exemplary embodiments, and do not limit the scope of the invention.

Regarding the numerical ranges described in stages in the present specification, the upper limit or lower limit of a numerical range may be replaced with the upper limit or lower limit of another numerical range described in stages. Furthermore, in the present specification, the upper limit or lower limit of a numerical range may be replaced with values described in examples.

Each component may include a plurality of corresponding substances. In a case where the amount of each component in a composition is mentioned, and there are two or more kinds of substances corresponding to each component in the composition, unless otherwise specified, the amount of each component means the total amount of two or more kinds of the substances present in the composition.

Electrostatic Charge Image Developing Toner

The electrostatic charge image developing toner (hereinafter, also referred to as a "toner") according to the present exemplary embodiment contains alkylsilane-treated silica particles, a linear aliphatic hydrocarbon having 10 or more and 18 or less carbon atoms (hereinafter, also referred to as a "specific linear aliphatic hydrocarbon"), and toner particles.

With the above-described configuration of the toner according to the present exemplary embodiment, in a case where images having a low image density are continuously formed in a normal-temperature and low-humidity environment, the toner is stored in a high-temperature and high-humidity environment, and then an image having a high image density is formed, adhesion of the toner to a non-image portion is suppressed. The reason is presumed as follows.

From the viewpoint of fluidity of a toner and charge control for a toner, hydrophobic silica particles may be used as an external additive. From the viewpoint of ease of a hydrophobic treatment, for example, it is preferable to use alkylsilane-treated silica particles as the silica particles. However, due to steric hindrance of the alkyl group in the alkylsilane used for the alkylsilane treatment, it may be difficult to make the surface of the silica particles substantially uniformly hydrophobic, and the silica particles may have a non-hydrophobic portion.

In a case where images having a low image density are continuously formed in a normal-temperature and low-humidity environment, the toner is stored in a high-temperature and high-humidity environment, and then an image having a high image density is formed, adhesion of the toner to a non-image portion tends to occur in some cases.

It is considered that this is because, in a case where images having a low image density are continuously formed in a normal-temperature and low-humidity environment and the toner is stored in a high-temperature and high-humidity environment, charge leakage occurs from a non-hydrophobic portion of the silica particles due to the influence of high humidity accompanied by humidity change, and the charge of the toner is reduced.

The toner according to the present exemplary embodiment contains alkylsilane-treated silica particles and a linear aliphatic hydrocarbon having 10 or more and 18 or less carbon atoms (that is, the specific linear aliphatic hydrocarbon). The specific linear aliphatic hydrocarbon has a high degree of freedom in the structure of the specific linear aliphatic hydrocarbon. Therefore, since the specific linear aliphatic hydrocarbon and the alkyl group derived from the alkylsilane are likely to be entangled with each other, the specific linear aliphatic hydrocarbon is likely to be present on the surface of the silica particles. In addition, the specific linear aliphatic hydrocarbon is also likely to present in the non-hydrophobic portion within the surface of the alkylsilane-treated silica particles. Therefore, in the case where images having a low image density are continuously formed in a normal-temperature and low-humidity environment and the toner is stored in a high-temperature and high-humidity environment, the charge leakage from the non-hydrophobic portion of the silica particles is suppressed, and the charge of the toner is reduced. Since the shape of the linear aliphatic hydrocarbon is changed according to the environment, it is considered that the hydrophobicity is kept even in a high humidity accompanied by humidity change.

Moreover, by setting the number of carbon atoms in the specific linear aliphatic hydrocarbon to 10 or more, the degree of freedom in the structure of the specific linear aliphatic hydrocarbon is further increased. It is considered that this is because the specific linear aliphatic hydrocarbon is present in a state in which the non-hydrophobic portion of the alkylsilane-treated silica particles is covered with the linear portion while being entangled with the alkyl group of the alkylsilane, thereby increasing the hydrophobicity. By setting the number of carbon atoms in the specific linear aliphatic hydrocarbon to 18 or less, it is considered that detachment from the surface of the alkylsilane-treated silica particles is less likely to occur. It is considered that this is because, in a case where the number of carbon atoms in the specific linear aliphatic hydrocarbon is more than 18, steric hindrance occurs, so that the specific linear aliphatic hydrocarbon is less likely to be entangled with the alkyl group of the alkylsilane and is also more likely to be released.

From the above, with the toner according to the present exemplary embodiment, it is presumed that, in a case where images having a low image density are continuously formed in a normal-temperature and low-humidity environment, the toner is stored in a high-temperature and high-humidity environment, and then an image having a high image density is formed, adhesion of the toner to a non-image portion is suppressed.

Alkylsilane-Treated Silica Particles

The toner according to the present exemplary embodiment contains alkylsilane-treated silica particles.

The alkylsilane-treated silica particles are silica particles subjected to a surface treatment with an alkylsilane.

Hereinafter, the silica particles to be subjected to a surface treatment with an alkylsilane may be silica, that is, particles containing $SiO_2$ as a main component. In the present specification, the "main component" refers to a component that occupies equal to or more than 50% by mass of the total mass of a mixture of a plurality of kinds of components.

The alkylsilane is a silicon compound having an alkyl group that is directly bonded to a silicon atom.

The number of carbon atoms in the alkyl group of the alkylsilane is, for example, preferably 1 or more and 3 or less, more preferably 1 or more and 2 or less, and even more preferably 1.

The alkylsilane is, for example, preferably a silicon compound having an alkyl group and an alkoxy group, and more preferably a compound including an alkyl group, an alkoxy group, and a silicon atom.

A numerical range of the number of carbon atoms in the alkoxy group is the same as the numerical range of the number of carbon atoms in the alkyl group of the alkylsilane.

The number of alkyl groups in the alkylsilane is, for example, preferably 1 or more and 3 or less, more preferably 1 or 3, and even more preferably 3, per silicon atom.

The number of alkoxy groups contained in the alkylsilane is, for example, preferably 1 or more and 3 or less, more preferably 1 or 3, and even more preferably 1, per silicon atom.

The alkylsilane is, for example, preferably at least one kind of compound selected from the group consisting of alkylsilanes represented by Formula (1), Formula (2), and Formula (3).

Formula (1)

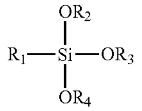

Formula (2)

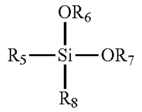

Formula (3)

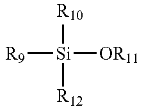

In Formula (1) to Formula (3), $R_1$ to $R_{12}$ each independently represent an alkyl group having 1 or more and 3 or less carbon atoms.

A numerical range of the number of carbon atoms in the alkyl group represented by $R_1$ to $R_{12}$ is the same as the numerical range of the number of carbon atoms in the alkyl group of the alkylsilane.

In Formula (1), for example, $R_1$ to $R_4$ preferably each represent at least one kind of group selected from the group consisting of a methyl group, an ethyl group, and a propyl group, and more preferably all represent a methyl group.

In Formula (2), for example, $R_5$ to $R_8$ preferably each represent at least one kind of group selected from the group consisting of a methyl group, an ethyl group, and a propyl group, and more preferably all represent a methyl group.

In Formula (3), for example, $R_9$ to $R_{12}$ preferably each represent at least one kind of group selected from the group consisting of a methyl group, an ethyl group, and a propyl group, and more preferably all represent a methyl group.

In a case where at least one compound selected from the group consisting of alkylsilanes represented by Formula (1) to Formula (3) is adopted as the alkylsilane, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

Presumably, this is because the above-described alkylsilane represented by Formula (1) to Formula (3) is easily entangled with the specific linear aliphatic hydrocarbon.

From the viewpoint of further suppressing the adhesion of the toner to a non-image portion, for example, the alkylsilane is preferably the alkylsilane represented by Formula (1) or Formula (3).

It is preferable that all the alkyl groups of the alkylsilanes represented by Formula (1) to Formula (3) are, for example, methyl groups.

In a case where all of the alkyl groups of the alkylsilanes represented by Formula (1) to Formula (3) are methyl groups, the hydrophobicity is high. Therefore, the hydrophobicity of the alkylsilane-treated silica particles is further increased. In addition, since the steric hindrance is small, the alkylsilane-treated silica particles are likely to be uniformly hydrophobically treated, and are more likely to be entangled with the specific linear aliphatic hydrocarbon. Therefore, the charge leakage due to the influence of high humidity is further suppressed.

The average primary particle size of the alkylsilane-treated silica particles is, for example, preferably 20 nm or more and 200 nm or less, more preferably 40 nm or more and 150 nm or less, and even more preferably 60 nm or more and 140 nm or less.

In addition, from the viewpoint that, by suppressing embedding of the alkylsilane-treated silica particles in the toner and the release from the toner particles in a case of being stored at a high temperature and a high humidity, the adhesion of the toner to the non-image portion in a case of forming an image having a high image density, the average primary particle size of the alkylsilane-treated silica particles is, for example, preferably 20 nm or more and 100 nm or less, more preferably 30 nm or more and 80 nm or less, and even more preferably 40 nm or more and 70 nm or less.

The average primary particle size of the alkylsilane-treated silica particles is measured by the following method.

Primary particles of the alkylsilane-treated silica particles are observed and imaged with a scanning electron microscope (SEM) device (S-4100, manufactured by Hitachi, Ltd.), the image is input in an image analyzer (LUZEXIII, manufactured by NIRECO.) to measure the area of each of the primary particles by image analysis, and an equivalent circular diameter is calculated from the areas. This equivalent circular diameter is calculated for 100 alkylsilane-treated silica particles. In a volume-based cumulative frequency distribution of the obtained equivalent circular diameter, a diameter at which the percentage of the particles is 50% (D50) is adopted as the average primary particle size of the alkylsilane-treated silica particles (average equivalent circular diameter D50). The magnification of the electron microscope is adjusted such that about 10 or more and 50 or less alkylsilane-treated silica particles are projected in one field of view. The equivalent circular diameter of the primary particles is determined by combining observation results obtained in a plurality of fields of view.

The content of the alkylsilane-treated silica particles with respect to the mass of the toner particles is, for example, preferably 0.01% by mass or more and 10% by mass or less, more preferably 0.05% by mass or more and 5% by mass or less, and even more preferably 0.1% by mass or more and 3% by mass or less.

Manufacturing Method of Alkylsilane-Treated Silica Particles

The alkylsilane-treated silica particles are manufactured through manufacturing of silica base particles and alkylsilane treatment.

Manufacturing of Silica Base Particles

It is preferable that silica base particles are manufactured, for example, by a wet method. The "wet method" is different from a gas phase method and is a manufacturing method performed by neutralizing sodium silicate with a mineral acid or hydrolyzing an alkoxysilane.

It is preferable that the silica base particles are manufactured, for example, by a sol-gel method among wet methods.

Hereinafter, as a manufacturing method of the silica base particles, a sol-gel method will be described for example.

The manufacturing method of the silica base particles is not limited to the sol-gel method.

The particle size of the silica base particles can be freely controlled by the hydrolysis of the sol-gel method, the weight ratio of alkoxysilane, ammonia, alcohol, and water in a polycondensation step, the reaction temperature, the stirring rate, and the supply rate.

Hereinafter, the manufacturing method of the silica base particles by the sol-gel method will be specifically described.

That is, while being heated, tetramethoxysilane is added dropwise and stirred in the presence of water and alcohol, by using aqueous ammonia as a catalyst. Next, the solvent is removed from the silica sol suspension obtained by the reaction, followed by drying, thereby obtaining target silica base particles.

Alkylsilane Treatment

Examples of the alkylsilane treatment method include a method of using supercritical carbon dioxide and dissolving an alkylsilane in the supercritical carbon dioxide such that the alkylsilane adheres to the surface of silica base particles; a method of applying a solution, which contains an alkylsilane and a solvent dissolving the alkylsilane, to the surface of the silica base particles in the air (for example, by spraying or coating) such that the alkylsilane adheres to the surface of the silica base particles; and a method of adding a solution, which contains an alkylsilane and a solvent dissolving the alkylsilane, to a silica base particle dispersion in the air, retaining the obtained mixed solution, and then drying the mixed solution of the silica base particle dispersion and the solution.

Specific Linear Aliphatic Hydrocarbon

The toner according to the present exemplary embodiment contains the specific linear aliphatic hydrocarbon.

The specific linear aliphatic hydrocarbon is a linear aliphatic hydrocarbon having 10 or more and 18 or less carbon atoms.

Here, the linear aliphatic hydrocarbon is an aliphatic hydrocarbon that does not have a branched structure in the structural formula. That is, carbon atoms constituting the linear aliphatic hydrocarbon is a primary carbon atom or a secondary carbon atom.

The specific linear aliphatic hydrocarbon may be a saturated aliphatic hydrocarbon (that is, an alkane) or an unsaturated aliphatic hydrocarbon, but from the viewpoint of further suppressing the adhesion of the toner to the non-image portion, the specific linear aliphatic hydrocarbon is, for example, preferably a saturated aliphatic hydrocarbon.

Here, a saturated aliphatic hydrocarbon which is the specific linear aliphatic hydrocarbon is referred to as a "linear alkane".

By using the linear alkane as the specific linear aliphatic hydrocarbon, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

Since the linear alkane does not have an unsaturated bond or the like, that lowers the degree of freedom of the structure, the degree of freedom of the structure is further increased. It is presumed that this is because the linear alkane and the alkyl group derived from the alkylsilane are likely to be entangled with each other.

The number of carbon atoms in the linear alkane is, for example, preferably 10 or more and 16 or less, more preferably 11 or more and 16 or less, and even more preferably 12 or more and 16 or less.

By setting the number of carbon atoms in the linear alkane to 10 or more and 16 or less, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

By setting the number of carbon atoms in the linear alkane to 10 or more, the degree of freedom in the structure of the linear alkane is further increased. It is considered that this is because the linear alkane is present in a state in which the non-hydrophobic portion of the alkylsilane-treated silica particles is covered with the linear portion while being entangled with the alkyl group of the alkylsilane, thereby increasing the hydrophobicity. By setting the number of carbon atoms in the linear alkane to 16 or less, it is considered that detachment from the surface of the alkylsilane-treated silica particles is less likely to occur. It is considered that this is because, in a case where the number of carbon atoms in the linear alkane is less than 16, the occurrence of steric hindrance is more suppressed, so that the linear alkane is more likely to be entangled with the alkyl group of the alkylsilane and is also less likely to be released.

From the viewpoint of further suppressing the adhesion of the toner to the non-image portion, the specific linear aliphatic hydrocarbon is, for example, preferably at least one selected from the group consisting of n-decane, n-dodecane, n-tetradecane, n-hexadecane, n-tridecane, and n-pentadecane, and more preferably n-hexadecane.

"n-" means normal.

The specific linear aliphatic hydrocarbon is contained, for example, preferably in the alkylsilane-treated silica particles.

By containing the specific linear aliphatic hydrocarbon in the alkylsilane-treated silica particles, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

In a case where the specific linear aliphatic hydrocarbon is contained in the alkylsilane-treated silica particles, it is presumed that the alkyl group derived from the alkylsilane and the specific linear aliphatic hydrocarbon are more likely to come close to each other and may be more easily entangled with each other, which may further suppress the adhesion of the toner to a non-image portion.

Examples of the method of incorporating the specific linear aliphatic hydrocarbon into the alkylsilane-treated silica particles include a method of dissolving the alkylsilane in supercritical carbon dioxide in an alkylsilane treatment performed on the silica particles by using supercritical carbon dioxide and then dissolving the specific linear aliphatic hydrocarbon in the supercritical carbon dioxide after a passage of certain period time.

Surface Treatment Amount of Alkylsilane and Content of Specific Linear Aliphatic Hydrocarbon Content of Specific Linear Aliphatic Hydrocarbon The content of the specific linear aliphatic hydrocarbon with respect to the total amount of the alkylsilane-treated silica particles is, for example, preferably 50 ppm or more and 1,000 ppm or less, more preferably 50 ppm or more and 800 ppm or less, and even more preferably 100 ppm or more and 500 ppm or less.

In a case where the content of the specific linear aliphatic hydrocarbon with respect to the total amount of the alkylsilane-treated silica particles is 50 ppm or more, it is presumed that the amount of the specific linear aliphatic hydrocarbon is contained to such as extent that the alkyl group derived from the alkylsilane and the specific linear aliphatic hydrocarbon are sufficiently entangled with each other.

Presumably, in a case where the content of the specific linear aliphatic hydrocarbon with respect to the total amount of the alkylsilane-treated silica particles is 1,000 ppm or less, steric hindrance between the specific linear aliphatic hydrocarbons is suppressed, so that the hydrophobicity can be increased by covering the non-hydrophobic portion of the alkylsilane-treated silica particles with the specific linear aliphatic hydrocarbon.

Therefore, by setting the content of the specific linear aliphatic hydrocarbon within the above-described numerical range, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

The content of the specific linear aliphatic hydrocarbon with respect to the alkylsilane-treated silica particles is calculated by the following procedure. Specifically, a "content of the specific linear aliphatic hydrocarbon per 10 g of the toner" and a "content of the alkylsilane-treated silica particles per 10 g of the toner" are calculated, and from the calculated values, the "content of the specific linear aliphatic hydrocarbon with respect to the alkylsilane-treated silica particles" is calculated.

Calculation of Content of Specific Linear Aliphatic Hydrocarbon per 10 g of Toner As a measurement target, 10 g of the toner is added to 100 ml of a 0.5% aqueous solution of a surfactant (for example, preferably sodium alkylbenzene sulfonate), thereby obtaining a toner dispersion. The dispersion is subjected to a dispersion treatment for 5 minutes by using an ultrasonic disperser, and filtered using a filter having an opening size of 0.5 μm to separate the toner particles. The filtrate is dried, the mass of the obtained dried filtrate is measured, 200 mg of the obtained dried filtrate is weighed, and the content of the specific linear aliphatic hydrocarbon is analyzed with a headspace gas chromatography mass spectrometer (GCMS-QP2020, Shimadzu Corporation.).

200 mg of the dried filtrate is put in a vial, and heated to 190° C. with a heating time of 3 minutes. Next, volatile components in the vial are introduced into a column (RTX-1, film thickness: 1 μm, inner diameter: 0.32 mm, length: 60 m) and measured under the following column separation conditions. A peak detection amount for a retention time of 16 minutes is converted into n-hexane and adopted as the content of the specific linear aliphatic hydrocarbon per 200 mg of the dried filtrate.

Column separation conditions: holding for 5 minutes at an initial temperature of 40° C., heating to 250° C. at a rate of 5° C./min, and holding for 11 minutes at 250° C. Pressure 120 Pa, purge flow rate 30 ml/min. Ion source temperature 260° C., interface temperature 260° C.

The content of the specific linear aliphatic hydrocarbon per 200 mg of the dried filtrate calculated by the above procedure is converted into a content per total amount of the dried filtrate, and the obtained value is adopted as the content of the specific linear aliphatic hydrocarbon per 10 g of the toner.

Content of Alkylsilane-Treated Silica Particles per 10 g of Toner

Subsequently, a content of the alkylsilane-treated silica particles per 10 g of the toner is calculated.

The amount of the alkylsilane-treated silica particles in the toner is analyzed by a measurement method using fluorescent X-rays described below.

First, as a measurement target, 150 mg of the toner is precisely weighed and subjected to pressure molding for 1 minute in a pressure molding machine at 5 t/$cm^2$, thereby producing a disk-shaped measurement sample having a diameter of 10 mm.

Next, for the produced measurement sample, by using a wavelength dispersive X-ray fluorescence analyzer XRF-1500 (manufactured by Shimadzu Corporation.) and an Rh target, a value of Net intensity (kcps) which is an amount of generated X-rays derived from each element is measured under the measurement conditions of a tube voltage of 40 KV, a tube current of 70 mA, and a measurement time of 30 minutes.

On the other hand, toners of 7 levels are produced in advance, which consist of toners of 6 levels obtained by varying the amount of silica particles added (amount of silica particles added: 0.5% by mass, 1% by mass, 2% by mass, 5% by mass, 10% by mass, and 20% by mass (all are amounts of silica particles added with respect to the toner particles)) and a toner without silica particles added, and a calibration curve showing the correlation between the amount of silica particles added and the value of Net intensity of fluorescent X-rays is plotted. Thereafter, based on approximation, the content of the alkylsilane-treated silica particles per 10 g of the toner is calculated from the value of Net intensity (kcps) of the measurement sample.

Calculation of Content of Specific Linear Aliphatic Hydrocarbon with Respect to Alkylsilane-Treated Silica Particles By using the "content of the specific linear aliphatic hydrocarbon per 10 g of the toner" and the "content of the alkylsilane-treated silica particles per 10 g of the toner" calculated by the above procedure, the content of the specific linear aliphatic hydrocarbon with respect to the alkylsilane-treated silica particles is calculated by the following equation and expressed in ppm.

Equation: Content of specific linear aliphatic hydrocarbon with respect to alkylsilane-treated silica particles=Content of linear aliphatic hydrocarbon per 10 g of toner/Content of alkylsilane-treated silica particles per 10 g of toner Ratio (Content of Linear Aliphatic Hydrocarbon/Surface Treatment Amount of Alkylsilane)

The ratio of the content of the specific linear aliphatic hydrocarbon to the surface treatment amount of the alkylsilane (content of linear aliphatic hydrocarbon/surface treatment amount of alkylsilane) is, for example, preferably 0.0001 or more and 0.01 or less, more preferably 0.0003 or more and 0.01 or less, and even more preferably 0.0003 or more and 0.006 or less.

In a case where the ratio (content of linear aliphatic hydrocarbon/surface treatment amount of alkylsilane) is 0.0001 or more, it is presumed that the amount of the specific linear aliphatic hydrocarbon is contained to such as extent that the alkyl group derived from the alkylsilane and the specific linear aliphatic hydrocarbon are sufficiently entangled with each other.

In a case where the ratio (content of linear aliphatic hydrocarbon/surface treatment amount of alkylsilane) is 0.01 or less, the amount of the specific linear aliphatic hydrocarbon with respect to the alkyl group derived from the alkylsilane is appropriate. Therefore, the steric hindrance between the specific linear aliphatic hydrocarbons is suppressed, so that the specific linear aliphatic hydrocarbon is likely to be present in the non-hydrophobic portion within the surface of the alkylsilane-treated silica particles.

Therefore, by setting the content of the specific linear aliphatic hydrocarbon within the above-described numerical range, in a case where images having a low image density are continuously formed in a normal-temperature and low-humidity environment, the toner is stored in a high-temperature and high-humidity environment, and then an image having a high image density is formed, the adhesion of the toner to a non-image portion is further suppressed.

The surface treatment amount of the alkylsilane can be represented as the amount of raw materials used, or can be measured as follows.

In a case where the alkylsilane used for the surface treatment of the alkylsilane-treated silica particles as a measurement target has not been identified, pyrolysis GC-MS (GCMS-QP2020 from Shimadzu Corporation./PY2020D from Frontier Laboratories Ltd.) can be used to identify the alkylsilane used for the surface treatment. The measurement is performed using UltraALLOY-5 (inner diameter: 0.25 mm, film thickness: 0.25 μm, length: 30 m) column under the conditions of an oven temperature of 50° C. and a vaporizing chamber temperature of 310° C., and separation is performed under the conditions of heating to 310° C. at a heating rate of 10° C./min and holding time of 30 minutes. Under the conditions of an ion source temperature of 200° C. and an interface temperature of 310° C., an MS spectrum is obtained after 1.5 minutes of elution to identify the alkylsilane.

As a standard sample, surface-treated silica particles having different surface treatment amounts of alkylsilane are prepared. The standard sample is produced by the following procedure.

Production of Standard Sample

By a sol-gel method adopting the same particle size as the alkylsilane-treated silica particles that are the measurement target, silica particles are prepared. An apparatus equipped with an autoclave with a stirrer (volume: 500 ml) and a back pressure valve is prepared, and the silica particles are put in the autoclave. Thereafter, the autoclave is filled with liquefied carbon dioxide. Thereafter, the stirrer is operated, the autoclave is heated to 170° C. by a heater, and then the pressure is raised to 20 MPa by a carbon dioxide pump. Next, at a point in time when the circulation amount of the supercritical carbon dioxide that has been circulated (integrated value: measured as the circulation amount of carbon dioxide in the standard state) reaches 20 L, the circulation of the supercritical carbon dioxide is stopped, and then the same alkylsilane as the alkylsilane used for the surface treatment of the alkylsilane-treated silica particles that are a measurement target is added.

Thereafter, the temperature is kept at 170° C. by the heater and the pressure is kept at 20 MPa by the carbon dioxide pump such that the supercritical state of the carbon dioxide in the autoclave is maintained. In this state, the stirrer is operated, and the particles are retained for 30 minutes. After the particles are retained for 30 minutes, supercritical carbon dioxide is circulated again, the back pressure valve is opened such that the pressure is reduced to the atmospheric pressure, and the particles are cooled to room temperature. Thereafter, a standard sample is taken out of the autoclave.

By the above procedure, surface-treated silica particles having different surface treatment amounts of alkylsilane are produced as a standard sample. Specifically, as the standard sample, surface-treated silica particles are prepared which have surface treatment amounts of alkylsilane of 0% by mass, 5% by mass, 10% by mass, 20% by mass, 30% by mass, 40% by mass, and 50% by mass (all of the surface treatment amounts of alkylsilane are mass of the alkylsilane used for the surface treatment with respect to the total mass of the surface-treated silica particles).

By using TG-DTA (DTG-60 manufactured by Shimadzu Corporation.), the alkylsilane treatment amount of the standard samples is measured, and a calibration curve is plotted. The measurement conditions for TG-DTA are as follows. The temperature is raised to 600° C. under the condition of a heating rate of 10° C./min, and the temperature is held at 600° C. for 10 minutes. A difference between the absolute value of a mass loss occurring in a case where the sample is heated to 600° C. and the absolute value of a mass loss occurring in a case where the sample is heated to 180° C. (that is, "absolute value of mass loss occurring in a case where sample is heated to 600° C.—absolute value of mass loss occurring in a case where sample is heated to 180° C.") is adopted as the alkylsilane treatment amount, and a calibration curve is plotted. This calibration curve is represented by a graph where the ordinate shows the alkylsilane treatment amount (that is, "absolute value of mass loss occurring in a case where sample is heated to 600° C.—absolute value of mass loss occurring in a case where sample is heated to 180° C.") and the abscissa shows the surface treatment amount of the alkylsilane of the standard sample.

As a measurement target, 10 g of the toner is added to 100 ml of a 0.5% aqueous solution of a surfactant (for example, preferably sodium alkylbenzene sulfonate), thereby obtaining a toner dispersion. The dispersion is subjected to a dispersion treatment for 5 minutes by using an ultrasonic disperser, and filtered using a filter having an opening size of 0.5 μm to separate the toner particles. The filtrate is dried to collect the alkylsilane-treated silica particles. The collected alkylsilane-treated silica particles (1 g) are washed with 100 ml of methanol and thoroughly dried. Under the same conditions as the conditions for measuring the standard sample, the alkylsilane treatment amount (that is, "absolute value of mass loss occurring in a case where sample is heated to 600° C.—absolute value of mass loss occurring in a case where sample is heated to 180° C.") is measured, and from the calibration curve, the surface treatment amount of the alkylsilane (that is, the mass of the alkylsilane used for the surface treatment with respect to the total mass of the alkylsilane-treated silica particles, which is expressed in the unit of ppm) is calculated.

Toner Particles

The toner particles include, for example, a binder resin and, as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC•HLC-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed with the main component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total mass of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral•petroleum-based wax such as montan wax; ester-based wax such as fatty acid esters and montanic acid esters; and the like. The release agent is not limited to these.

In a case where the release agent contains a hydrocarbon compound, the number of carbon atoms in the hydrocarbon compound contained in the release agent is, for example, preferably 19 or more and more preferably 22 or more.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter, Inc.) and using ISOTON-II (manufactured by Beckman Coulter, Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Thereafter, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

The toner according to the present exemplary embodiment may contain inorganic particles other than the alkylsilane-treated silica particles as an external additive.

Examples of the inorganic particles include $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO•SiO_2$, $K_2O•(TiO_2)_n$, $Al_2O_3•2SiO_2$, $CaCO_3$, $MgCO_3$, $BaSO_4$, and $MgSO_4$.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, and an aluminum-based coupling agent. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of the external additives used in combination with the alkylsilane-treated silica particles with respect to the toner particles is, for example, preferably 0% by mass or more and 5% by mass or less, and more preferably 0% by mass or more and 3% by mass or less.

Manufacturing Method of Toner

Next, the manufacturing method of the toner according to the present exemplary embodiment will be described.

The toner according to the present exemplary embodiment is obtained by manufacturing toner particles and then externally adding the alkylsilane-treated silica particles to the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method may be used for obtaining toner particles.

Specifically, for example, in a case where the toner particles are manufactured by the aggregation and coalescence method, the toner particles are manufactured through a step of preparing a resin particle dispersion in which resin particles to be a binder resin are dispersed (a resin particle dispersion-preparing step), a step of allowing the resin particles (plus other particles as necessary) to be aggregated in the resin particle dispersion (having been mixed with another particle dispersion as necessary) so as to form aggregated particles (aggregated particle-forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. Naturally, other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle-Forming Step

Next, the resin particle dispersion is mixed with the colorant particle dispersion and the release agent particle dispersion.

Thereafter, in the mixed dispersion, the resin particles, the colorant particles, and the release agent particles are heteroaggregated such that aggregated particles are formed which have a diameter close to the diameter of the target toner particles and include the resin particles, the colorant particles, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Thereafter, the dispersion is heated to the glass transition temperature of the resin particles (specifically, for example, to a temperature equal to or higher than the glass transition temperature of the resin particles—30° C. and equal to or lower than the glass transition temperature of the resin particles—10° C.) such that the particles dispersed in the mixed dispersion are aggregated, thereby forming aggregated particles.

In the aggregated particle-forming step, for example, in a state where the mixed dispersion is stirred with a rotary shearing homogenizer, the aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed to cause the resin particles to be aggregated and adhere to the surface of the aggregated particles and to form second aggregated particles, and a step of heating a second aggregated particle dispersion in which the second aggregated particles are dispersed to cause the second aggregated particles to coalesce and to form toner particles having a core/shell structure.

After the coalescence step, the toner particles formed in a solution undergo a known washing step, solid-liquid separation step, and drying step, thereby obtaining dry toner particles.

The washing step is not particularly limited. However, in view of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding the alkylsilane-treated silica particles to the obtained dry toner particles and mixing the alkylsilane-treated silica particles and the toner particles together, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing the toner and a carrier together.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; and a resin impregnation-type carrier obtained by impregnating porous magnetic powder with a resin.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; and a kneader coater method of mixing the core material of the carrier with the solution for forming a coating layer in a kneader coater and removing solvents.

The mixing ratio (mass ratio) between the toner and the carrier, represented by toner:carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, well-known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be attached to and detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detachable from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Toners including toners of four colors, yellow, magenta, cyan, and black, stored in containers of toner cartridges 8Y, 8M, 8C, and 8K are supplied to developing devices (developing units) 4Y, 4M, 4C, and 4K of units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as in the first unit 10Y, such that the second to fourth units 10M, 10C, and 10K will not be described again.

The first unit 10Y has a photoreceptor 1Y that acts as an image holder. Around the photoreceptor 1Y, a charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on color-separated image signals to form an electrostatic charge image, a developing device (an example of the developing unit) 4Y that develops the electrostatic charge image by supplying a charged toner to the electrostatic charge image, a primary transfer roll (an example of the primary transfer unit) 5Y that transfers the developed toner image onto the intermediate transfer belt 20, and a photoreceptor cleaning device (an example of the cleaning unit) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where the photosensitive layer is irradiated with the laser beam 3Y, the specific resistance of the portion irradiated with the laser beam changes. Therefore, through an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y turns into a visible image (developed image) as a toner image by the developing device 4Y.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

Meanwhile, the residual toner on the photoreceptor 1Y is removed by a photoreceptor cleaning device 6Y and collected.

Furthermore, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of secondary transfer unit) disposed on the image holding surface side of the intermediate transfer belt 20. On the other hand, through a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Thereafter, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet, in addition to the recording paper P.

In order to further improve the smoothness of the image surface after fixing, for example, it is preferable that the surface of the recording paper P is also smooth. For example, coated paper prepared by coating the surface of plain paper with a resin or the like, art paper for printing, and the like are suitably used.

The recording paper P on which the color image has been fixed is transported to an output portion, and a series of color image forming operations is finished.

Process Cartridge/Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
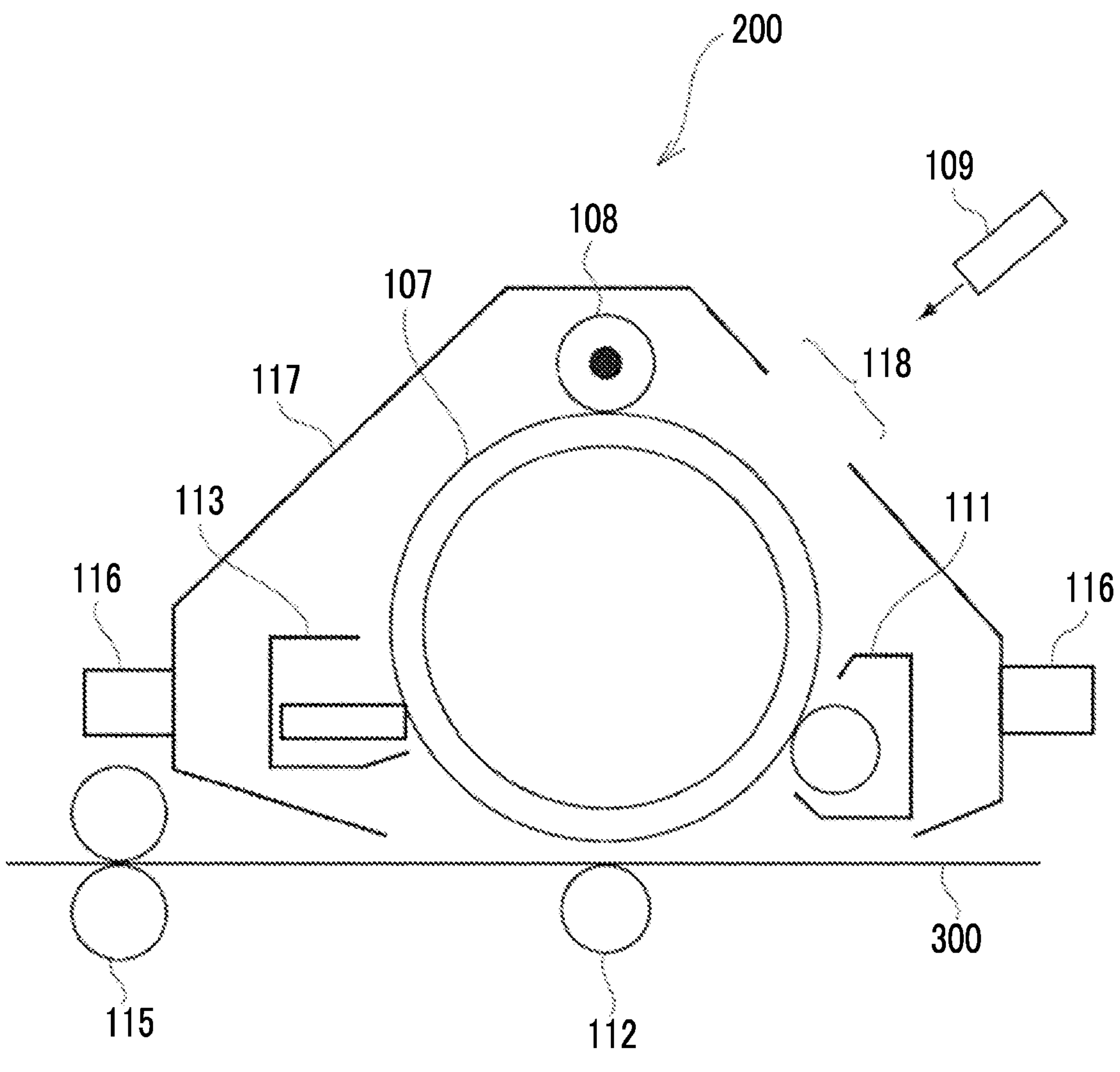
FIG. 2 is a view schematically showing the configuration of a process cartridge according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Examples will be described below, but the present invention is not limited to these examples. In the following description, unless otherwise specified, "parts" and "%" are based on mass in all cases.

Preparation of Toner Particles

Preparation of Amorphous Polyester Resin Dispersion (A1)

Ethylene glycol: 37 parts

Neopentyl glycol: 65 parts 1,9-Nonanediol: 32 parts

Terephthalic acid: 96 parts

The above materials are put in a reaction vessel, the temperature is raised to 200° C. for 1 hour, and after it is confirmed that the inside of the reaction system is uniformly stirred, 1.2 parts of dibutyltin oxide is added. The temperature is raised to 240° C. for 6 hours in a state where the generated water is distilled off, and stirring is continued at 240° C. for 4 hours, thereby obtaining an amorphous polyester resin (acid value 9.4 mgKOH/g, weight-average molecular weight 13,000, glass transition temperature 62° C.). Molten amorphous polyester resin is transferred as it is to an emulsifying disperser (CAVITRON CD1010, Eurotech Ltd.) at a rate of 100 g/min. Separately, dilute aqueous ammonia having a concentration of 0.37% obtained by diluting the reagent aqueous ammonia with deionized water is put in a tank and transferred to an emulsifying disperser together with the amorphous polyester resin at a rate of 0.1 L/min while being heated at 120° C. by a heat exchanger. The emulsifying disperser is operated under the conditions of a rotation speed of a rotor of 60 Hz and a pressure of 5 kg/cm$^2$, thereby obtaining an amorphous polyester resin dispersion (A1) having a volume-average particle size of 160 nm and a solid content of 20%.

Preparation of Crystalline Polyester Resin Dispersion (C1)

Decanedioic acid: 81 parts

Hexanediol: 47 parts

The above materials are put in a reaction vessel, the temperature is raised to 160° C. for 1 hour, and after it is confirmed that the inside of the reaction system is uniformly stirred, 0.03 parts of dibutyltin oxide is added. While the generated water is distilled off, the temperature is raised to 200° C. for 6 hours, and stirring is continued for 4 hours at 200° C. Thereafter, the reaction solution is cooled, solid-liquid separation is performed, and the solid is dried at a temperature of 40° C. under reduced pressure, thereby obtaining a crystalline polyester resin (C1) (melting point 64° C., weight-average molecular weight of 15,000).

Crystalline polyester resin (C1): 50 parts

Anionic surfactant (manufactured by DKS Co. Ltd., NEOGEN RK): 2 parts

Deionized water: 200 parts

The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 180 nm, the dispersed resultant is collected, thereby obtaining a crystalline polyester resin dispersion (C1) having a solid content of 20%.

Preparation of Release Agent Particle Dispersion (W1)

Paraffin wax (manufactured by NIPPON SEIRO CO., LTD., HNP-9,): 100 parts

Anionic surfactant (manufactured by DKS Co. Ltd., NEOGEN RK): 1 part

Deionized water: 350 parts

The above materials are mixed together, heated to 100° C., and dispersed using a homogenizer (ULTRA-TURRAX T50 manufactured by IKA). By using a pressure jet-type Gorlin homogenizer, a dispersion treatment is performed, thereby obtaining a release agent particle dispersion in which release agent particles having a volume-average particle size of 200 nm are dispersed. Deionized water is added to the release agent particle dispersion such that the solid content thereof is adjusted to 20%, thereby obtaining a release agent particle dispersion (W1).

Preparation of Colorant Particle Dispersion (C1)

Cyan pigment (Pigment Blue 15:3, Dainichiseika Color & Chemicals Mfg. Co., Ltd.): 50 parts Anionic surfactant (manufactured by DKS Co. Ltd., NEOGEN RK): 5 parts Deionized water: 195 parts The above materials are mixed together and subjected to a dispersion treatment for 60 minutes by using a high-pressure impact disperser (ULTIMIZER HJP30006, manufactured by SUGINO MACHINE LIMITED), thereby obtaining a colorant particle dispersion (C1) having a solid content of 20%.

Preparation of Toner Particles

Deionized water: 200 parts

Amorphous polyester resin dispersion (A1): 150 parts

Crystalline polyester resin dispersion (C1): 10 parts

Release agent particle dispersion (W1): 10 parts

Colorant particle dispersion (C1): 15 parts

Anionic surfactant (TaycaPower): 2.8 parts

The above materials are put in a reaction vessel, 0.1N nitric acid is added thereto to adjust the pH to 3.5, and then an aqueous polyaluminum chloride solution obtained by dissolving 2 parts of polyaluminum chloride (manufactured by Oji Paper Co., Ltd., 30% powder product) in 30 parts of deionized water is added thereto. The obtained solution is dispersed at 30° C. by using a homogenizer (ULTRA-TURRAX T50 manufactured by IKA), heated to 45° C. in an oil bath for heating, and retained until the volume-average particle size reaches 4.9 Next, 60 parts of the amorphous polyester resin dispersion (A1) is added thereto, and the mixture is retained for 30 minutes. Thereafter, at a point in time when the volume-average particle size reaches 5.2 μm, parts of the amorphous polyester resin dispersion (A1) is further added thereto, and the mixture is retained for 30 minutes. Subsequently, 20 parts of a 10% aqueous solution of NTA (nitrilotriacetic acid) metal salt (CHELEST 70, manufactured by CHELEST CORPORATION) is added thereto, and a 1N aqueous sodium hydroxide solution is added thereto to adjust the pH to 9.0. Thereafter, 1 part of an anionic surfactant (TaycaPower) is added thereto, and the mixture is heated to 85° C. while being continuously stirred and retained for 5 hours. The mixture is then cooled to 20° C. at a rate of 20° C./min. Thereafter, the mixture is filtered, thoroughly washed with deionized water, and dried, thereby obtaining toner particles having a volume-average particle size of 5.7 μm and an average circularity of 0.971.

Preparation of Alkylsilane-Treated Silica Particles

Alkylsilane-Treated Silica Particles (S1)

Preparation of Silica Base Particles

Methanol (255 parts) and 41 parts of 10% aqueous ammonia are added to a 1.5 L glass reaction vessel equipped with a stirrer, a dripping nozzle, and a thermometer, followed by mixing, thereby obtaining a mixed solution. The temperature of the mixed solution is adjusted to 25° C., and then 150 parts of tetramethoxysilane and 79 parts of 3.8% aqueous ammonia are added dropwise thereto at the same addition start point for 60 minutes under stirring, thereby obtaining 420 parts of a hydrophilic silica particle dispersion.

Thereafter, 420 parts of methanol is added to the hydrophilic silica particle dispersion, and the mixture is heated at 60° C. under stirring until the dispersion is concentrated to a mass of 420 parts. The operation is repeated twice more, thereby obtaining a concentrated dispersion. The weight ratio of silica in the concentrated dispersion is adjusted to 50%, and the weight ratio of water to alcohol in the concentrated dispersion is adjusted to 0, thereby obtaining a silica base particle dispersion.

Alkylsilane Treatment

The silica base particle dispersion is subjected to a solvent removal treatment and an alkylsilane treatment as shown below.

An apparatus equipped with an autoclave with a stirrer (volume: 500 ml) and a back pressure valve is prepared, and 400 parts of the silica base particle dispersion is added to the autoclave. Thereafter, the autoclave is filled with liquefied carbon dioxide. Next, the stirrer is operated at 200 rpm, the autoclave is heated to 150° C. by a heater, and then the pressure is raised to 201 MPa by a carbon dioxide pump. In this way, supercritical carbon dioxide is circulated in the autoclave such that the solvent of the silica base particle dispersion is removed. A trapping device is kept at 0° C. by a refrigerant such that the removed solvent can be separated from carbon dioxide. The flow rate of carbon dioxide is measured with a gas flow meter.

Subsequently, at a point in time when the circulation amount of the supercritical carbon dioxide that has been circulated (integrated value: measured as the circulation amount of carbon dioxide in the standard state) reaches 20 L, the circulation of the supercritical carbon dioxide is stopped, and then trimethylmethoxysilane as an alkylsilane is added thereto such that the alkylsilane-treated silica particles have a surface treatment amount of the alkylsilane of 25% by mass. Next, as the specific linear aliphatic hydrocarbon, n-hexadecane is added thereto such that the content of the specific linear aliphatic hydrocarbon is 300 ppm with respect to the total mass of the alkylsilane-treated silica particles.

Thereafter, the temperature is kept at 150° C. by the heater and the pressure is kept at 20 MPa by the carbon dioxide pump such that the supercritical state of the carbon dioxide in the autoclave is maintained. In this state, the stirrer is operated at 200 rpm, and the particles are retained for 30 minutes as a hydrophobic treatment time. After the particles are retained for 30 minutes, supercritical carbon dioxide is circulated again, the back pressure valve is opened such that the pressure is reduced to the atmospheric pressure, and the particles are cooled to room temperature. Thereafter, alkylsilane-treated silica particles (S1) are taken out of the autoclave. The particle size of the obtained alkylsilane-treated silica particles (S1) is 50 nm.

Alkylsilane-Treated Silica Particles (S2) to (S20)

Alkylsilane-treated silica particles are obtained by the same procedure as the preparation procedure of the alkylsilane-treated silica particles (S1), except that the type of alkylsilane and the type of linear aliphatic hydrocarbon are changed as shown in Table 1, the amount of the alkylsilane added is changed such that the surface treatment amount of the alkylsilane of the alkylsilane-treated silica particles is as shown in Table 1, and the amount of the linear aliphatic hydrocarbon added is changed such that the content of the linear aliphatic hydrocarbon with respect to the total mass of the alkylsilane-treated silica particles is as shown in Table 1.

Alkylsilane-Treated Silica Particles (S21)

Alkylsilane-treated silica particles are obtained by the same procedure as the preparation procedure of the alkylsilane-treated silica particles (S1), except that in Production of Silica Base Particles, the amount of 10% aqueous ammonia added is changed to 39 parts by mass, and the amount of tetramethoxysilane added is changed to 140 parts by mass. The particle size of the obtained silica particles (S21) is 30 nm.

TABLE 1

| | Alkylsilane | | Linear aliphatic hydrocarbon | |
|---|---|---|---|---|
| Type of alkylsilane-treated silica particles | Type | Surface treatment amount of alkylsilane (%) | Type | Content of specific linear aliphatic hydrocarbon with respect to total mass of alkylsilane-treated silica particles (ppm) |
| S1 | Trimethylmethoxysilane | 25 | n-Hexadecane | 300 |
| S2 | Trimethylmethoxysilane | 25 | — | — |
| S3 | Trimethylmethoxysilane | 25 | n-Decane | 300 |
| S4 | Trimethylmethoxysilane | 25 | n-Octane | 300 |
| S5 | Trimethylmethoxysilane | 25 | n-Octadecane | 300 |
| S6 | Trimethylmethoxysilane | 25 | n-Icosane | 300 |
| S7 | Hexyltrimethoxysilane | 25 | n-Hexadecane | 300 |
| S8 | Triethylmethoxysilane | 25 | n-Hexadecane | 300 |
| S9 | Trimethylmethoxysilane | 25 | 1-Hexadecene | 300 |
| S10 | Trimethylmethoxysilane | 25 | n-Heptadecane | 300 |
| S11 | Trimethylmethoxysilane | 25 | n-Hexadecane | 50 |
| S12 | Trimethylmethoxysilane | 25 | n-Hexadecane | 40 |
| S13 | Trimethylmethoxysilane | 25 | n-Hexadecane | 1000 |
| S14 | Trimethylmethoxysilane | 25 | n-Hexadecane | 1100 |
| S15 | Trimethylmethoxysilane | 50 | n-Hexadecane | 50 |
| S16 | Trimethylmethoxysilane | 62.5 | n-Hexadecane | 40 |
| S17 | Trimethylmethoxysilane | 10 | n-Hexadecane | 1000 |
| S18 | Trimethylmethoxysilane | 10 | n-Hexadecane | 1200 |
| S19 | Trimethylmethoxysilane | 10 | n-Undecane | 300 |
| S20 | Methyltrimethoxysilane | 25 | n-Hexadecane | 300 |
| S21 | Trimethylmethoxysilane | 25 | n-Hexadecane | 300 |

Example 1: Production of Toner and Developer

The alkylsilane-treated silica particles (S1) (2 parts) are added to 100 parts of the toner particles, followed by mixing using a Henschel mixer at a circumferential speed of stirring of 30 m/sec for 15 minutes, thereby obtaining toners.

Each of the obtained toners and the following resin-coated carrier is put in a V blender at a ratio of toner:carrier=8:92 (mass ratio) and stirred for 20 minutes, thereby obtaining a developer.

Carrier

- Mn—Mg—Sr-based ferrite particles (average particle size: 40 μm): 100 parts
- Toluene: 14 parts
- Polymethyl methacrylate: 2 parts
- Carbon black (VXC72: manufactured by Cabot Corporation): 0.12 parts The above materials excluding ferrite particles are mixed with glass beads (diameter: 1 mm, in the same amount as toluene), and the mixture is stirred with a sand mill manufactured by Kansai Paint Co., Ltd. at a rotation speed of 1,200 rpm for 30 minutes, thereby obtaining a dispersion. The dispersion and the ferrite particles are put in a vacuum deaeration-type kneader and dried under reduced pressure with stirring, thereby obtaining a resin-coated carrier.

Examples 2 to 18 and Comparative Examples 1 to 3

Toners and developers are obtained by the same procedure as in Example 1, except that the type of alkylsilane-treated silica particles added to the toner particles is changed as shown in Table 2.

Evaluation

The developer obtained in each example is put in an image forming apparatus DCC400 (manufactured by FUJIFILM Business Innovation Corp.) equipped with an ATC sensor, and in an environment at 21° C. and 10% RH, a chart image (single line image; the same applies hereinafter) having an image density (image density refers to a proportion of toner adhering to the image) of 1% is printed on 10,000 sheets of A4 size paper (manufactured by FUJIFILM Business Innovation Corp., J paper). Thereafter, the image forming apparatus is left to stand for 7 days in an environment at 28° C. and 85% RH. After being left to stand, 30 chart images having an image density of 1% are printed, and the printed images are evaluated according to the following evaluation standard.

The evaluation standards G1 to G3 are in an acceptable range.

Evaluation Standard

G1: even in a case of observation with a loupe, no scattering of the toner on the non-image portion is observed on all 30 sheets of blank paper, which is a good image.

G2: in a case of observation with a loupe, scattering of the toner on the non-image portion is observed on 5 or less sheets of blank paper, which is a good image without any problem.

G2.5: in a case of observation with a loupe, scattering of the toner on the non-image portion is observed on 6 or more and 10 or less sheets of blank paper, but the image does not have a problem.

G3: in a case of observation with a loupe, scattering of the toner on the non-image portion is observed on 11 or more and 15 or less sheets of blank paper, which is an acceptable range.

G4: scattering of the toner on the non-image portion is visually observed on 5 or less sheets of blank paper, which is an unacceptable level.

G5: scattering of the toner on the non-image portion is visually observed on 6 or more sheets of blank paper, which is an unacceptable level.

TABLE 2

| | Alkylsilane-treated silica particles | | Linear aliphatic hydrocarbon | | | | | |
|---|---|---|---|---|---|---|---|---|
| | Type | Alkylsilane Type | Type | Number of carbon atoms | Content with respect to silica particles (ppm) | Contained place | Ratio (amount of HC/amount of AlSi) | Evaluation |
| Example 1 | 1 | Trimethylmethoxysilane | n-Hexadecane | 16 | 300 | Silica particles | 0.0012 | G1 |
| Comparative Example 1 | 2 | Trimethylmethoxysilane | — | — | — | Silica particles | — | G5 |
| Example 2 | 3 | Trimethylmethoxysilane | n-Decane | 10 | 300 | Silica particles | 0.0012 | G3 |
| Comparative Example 2 | 4 | Trimethylmethoxysilane | n-Octane | 8 | 300 | Silica particles | 0.0012 | G4 |
| Example 3 | 5 | Trimethylmethoxysilane | n-Octadecane | 18 | 300 | Silica particles | 0.0012 | G3 |
| Comparative Example 3 | 6 | Trimethylmethoxysilane | n-Icosane | 20 | 300 | Silica particles | 0.0012 | G4 |
| Example 4 | 7 | Hexyltrimethoxysilane | n-Hexadecane | 16 | 300 | Silica particles | 0.0012 | G3 |
| Example 5 | 8 | Triethylmethoxysilane | n-Hexadecane | 16 | 300 | Silica particles | 0.0012 | G3 |
| Example 6 | 9 | Trimethylmethoxysilane | 1-Hexadecene | 16 | 300 | Silica particles | 0.0012 | G2 |
| Example 7 | 10 | Trimethylmethoxysilane | n-Heptadecane | 17 | 300 | Silica particles | 0.0012 | G2 |
| Example 8 | 11 | Trimethylmethoxysilane | n-Hexadecane | 16 | 50 | Silica particles | 0.0002 | G2.5 |
| Example 9 | 12 | Trimethylmethoxysilane | n-Hexadecane | 16 | 40 | Silica particles | 0.00016 | G3 |
| Example 10 | 13 | Trimethylmethoxysilane | n-Hexadecane | 16 | 1000 | Silica particles | 0.004 | G2.5 |
| Example 11 | 14 | Trimethylmethoxysilane | n-Hexadecane | 16 | 1100 | Silica particles | 0.0044 | G3 |
| Example 12 | 15 | Trimethylmethoxysilane | n-Hexadecane | 16 | 50 | Silica particles | 0.0001 | G2 |
| Example 13 | 16 | Trimethylmethoxysilane | n-Hexadecane | 16 | 50 | Silica particles | 0.00008 | G2.5 |
| Example 14 | 17 | Trimethylmethoxysilane | n-Hexadecane | 16 | 1000 | Silica particles | 0.01 | G2 |
| Example 15 | 18 | Trimethylmethoxysilane | n-Hexadecane | 16 | 1200 | Silica particles | 0.012 | G2.5 |
| Example 16 | 19 | Trimethylmethoxysilane | n-Undecane | 11 | 300 | Silica particles | 0.0012 | G1 |
| Example 17 | 20 | Methyltrimethoxysilane | n-Hexadecane | 16 | 300 | Silica particles | 0.0012 | G1 |
| Example 18 | 21 | Trimethylmethoxysilane | n-Hexadecane | 16 | 300 | Silica particles | 0.0012 | G2 |

In Table 2, "-" means that the linear aliphatic hydrocarbon is not contained.

The description in Table 2 is as below.

Abbreviations for types of alkylsilanes and types of linear aliphatic hydrocarbon: same as abbreviations in Table 1

"Content with respect to silica particles (ppm)" described in the column under linear aliphatic hydrocarbon: content of linear aliphatic hydrocarbon with respect to total amount of alkylsilane-treated silica particles Ratio (amount of HC/amount of AlSi): ratio of content of linear aliphatic hydrocarbon to surface treatment amount of alkylsilane (content of linear aliphatic hydrocarbon/surface treatment amount of alkylsilane)

From the above results, with the toner according to the examples, in a case where images having a low image density are continuously formed in a normal-temperature and low-humidity environment, the toner is stored in a high-temperature and high-humidity environment, and then an image having a high image density is formed, the adhesion of the toner to the non-image portion is suppressed.

(((1))) An electrostatic charge image developing toner comprising:

alkylsilane-treated silica particles;

a linear aliphatic hydrocarbon having 10 or more and 18 or less carbon atoms; and toner particles.

(((2))) The electrostatic charge image developing toner according to (((1))), wherein the alkylsilane is at least one kind of compound selected from the group consisting of alkylsilanes represented by Formula (1), Formula (2), and Formula (3), Formula (1)

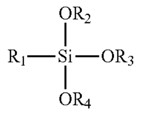

-continued

Formula (2)

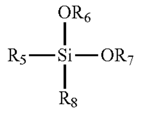

Formula (3)

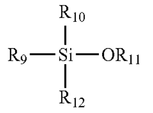

(in Formula (1) to Formula (3), $R_1$ to $R_{12}$ each independently represent an alkyl group having 1 or more and 3 or less carbon atoms).

(((3))) The electrostatic charge image developing toner according to (((2))), wherein all of alkyl groups of the alkylsilane are methyl groups.

(((4))) The electrostatic charge image developing toner according to any one of (((1))) to (((3))), wherein the linear aliphatic hydrocarbon is a linear alkane.

(((5))) The electrostatic charge image developing toner according to (((4))), wherein the number of carbon atoms in the linear alkane is 10 or more and 16 or less.

(((6))) The electrostatic charge image developing toner according to any one of (((1))) to (((5))), wherein a content of the linear aliphatic hydrocarbon is 50 ppm or more and 1,000 ppm or less with respect to a total amount of the silica particles.

(((7))) The electrostatic charge image developing toner according to any one of (((1))) to (((6))), wherein a ratio of a content of the linear aliphatic hydrocarbon to a surface treatment amount of the alkylsilane (content of linear aliphatic hydrocarbon/surface treatment amount of alkylsilane) is 0.0001 or more and 0.01 or less.

(((8))) The electrostatic charge image developing toner according to any one of (((1))) to (((7))), wherein the linear aliphatic hydrocarbon is contained in the silica particles.

(((9))) An electrostatic charge image developer comprising:

the electrostatic charge image developing toner according to any one of (((1))) to (((8))).

(((10))) A toner cartridge comprising:

a container that contains the electrostatic charge image developing toner according to any one of (((1))) to (((8))), wherein the toner cartridge is detachable from an image forming apparatus.

(((11))) A process cartridge comprising:

a developing unit that contains the electrostatic charge image developer according to (((9))) and develops an electrostatic charge image formed on a surface of an image holder as a toner image by using the electrostatic charge image developer, wherein the process cartridge is detachable from an image forming apparatus.

(((12))) An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to (((9))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

alkylsilane-treated silica particles;

a linear aliphatic hydrocarbon having 10 or more and 18 or less carbon atoms; and toner particles, wherein a content of the linear aliphatic hydrocarbon is 50 ppm or more and 1,000 ppm or less with respect to a total amount of the silica particles.

2. The electrostatic charge image developing toner according to claim 1, wherein the alkylsilane is at least one kind of compound selected from the group consisting of alkylsilanes represented by Formula (1), Formula (2), and Formula (3), Formula (1)

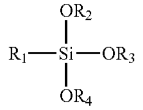

Formula (2)

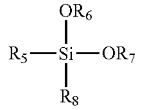

Formula (3)

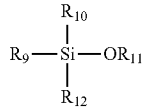

(in Formula (1) to Formula (3), $R_1$ to $R_{12}$ each independently represent an alkyl group having 1 or more and 3 or less carbon atoms).

3. The electrostatic charge image developing toner according to claim 2, wherein all of alkyl groups of the alkylsilane are methyl groups.

4. The electrostatic charge image developing toner according to claim 1, wherein the linear aliphatic hydrocarbon is a linear alkane.

5. The electrostatic charge image developing toner according to claim 4, wherein the number of carbon atoms in the linear alkane is 10 or more and 16 or less.

6. The electrostatic charge image developing toner according to claim 1, wherein a ratio of the content of the linear aliphatic hydrocarbon to a surface treatment amount of the alkylsilane (content of linear aliphatic hydrocarbon/surface treatment amount of alkylsilane) is 0.0001 or more and 0.01 or less.

7. The electrostatic charge image developing toner according to claim 1, wherein the linear aliphatic hydrocarbon is contained in the silica particles.

8. An electrostatic charge image developer comprising:

the electrostatic charge image developing toner according to claim 1.

9. An electrostatic charge image developer comprising:

the electrostatic charge image developing toner according to claim 2.

10. An electrostatic charge image developer comprising:

the electrostatic charge image developing toner according to claim 3.

11. An electrostatic charge image developer comprising:

the electrostatic charge image developing toner according to claim 4.

12. An electrostatic charge image developer comprising:

the electrostatic charge image developing toner according to claim 5.

13. An electrostatic charge image developer comprising:

the electrostatic charge image developing toner according to claim 6.

14. An electrostatic charge image developer comprising:

the electrostatic charge image developing toner according to claim 7.

15. A toner cartridge comprising:

a container that contains the electrostatic charge image developing toner according to claim 1, wherein the toner cartridge is detachable from an image forming apparatus.

16. A toner cartridge comprising:

a container that contains the electrostatic charge image developing toner according to claim 2, wherein the toner cartridge is detachable from an image forming apparatus.

17. A process cartridge comprising:

a developing unit that contains the electrostatic charge image developer according to claim 8 and develops an electrostatic charge image formed on a surface of an image holder as a toner image by using the electrostatic charge image developer, wherein the process cartridge is detachable from an image forming apparatus.

18. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 8 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

* * * * *